July 19, 1960 O. J. WINKELMANN 2,945,702
COMBINATION AIR SPRING-LEAF SPRING SUSPENSION
Filed Sept. 9, 1957 4 Sheets-Sheet 1
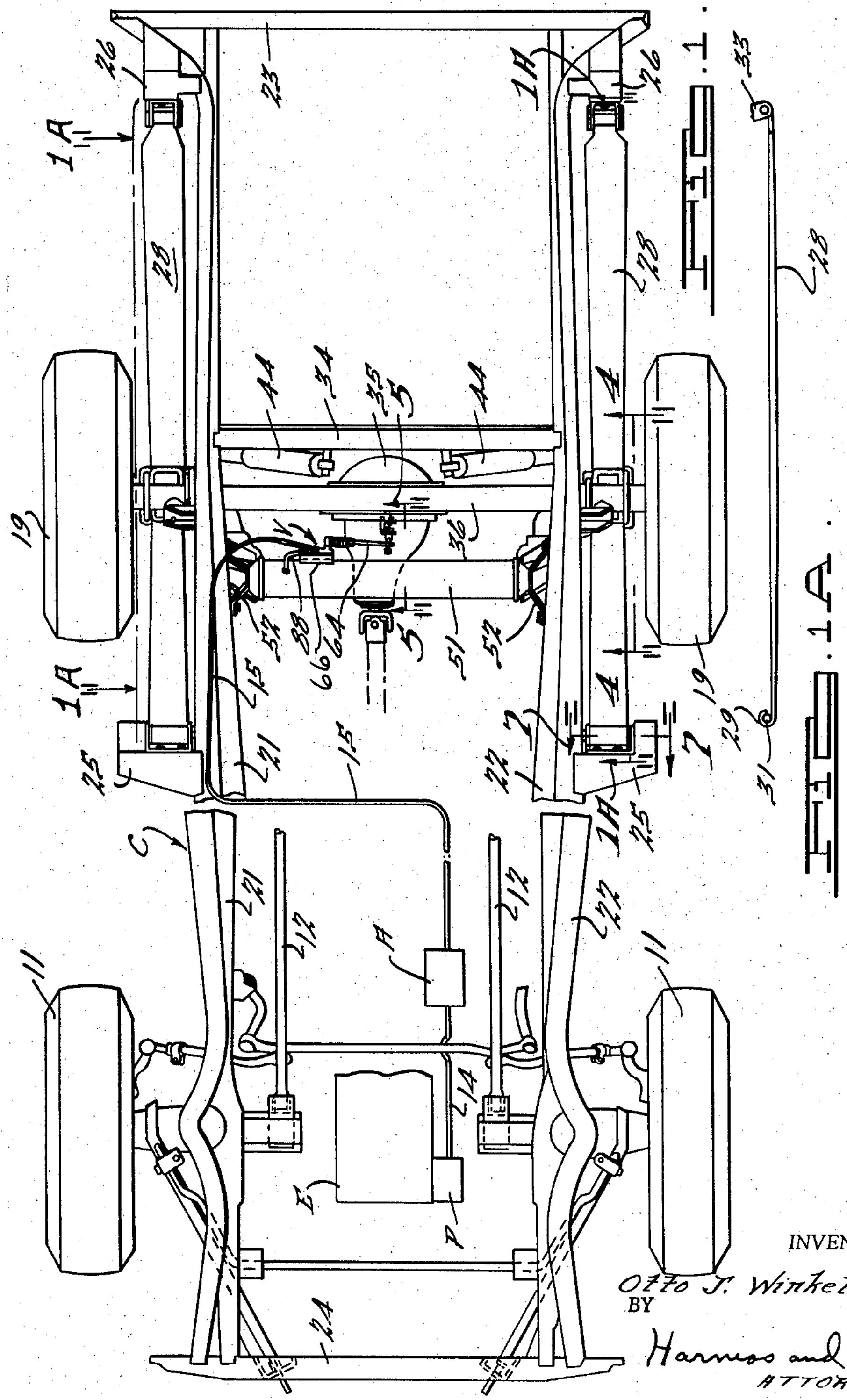
INVENTOR.
Otto J. Winkelmann
BY
Harness and Harris
ATTORNEYS July 19, 1960 O. J. WINKELMANN 2,945,702
COMBINATION AIR SPRING-LEAF SPRING SUSPENSION
Filed Sept. 9, 1957 4 Sheets-Sheet 2
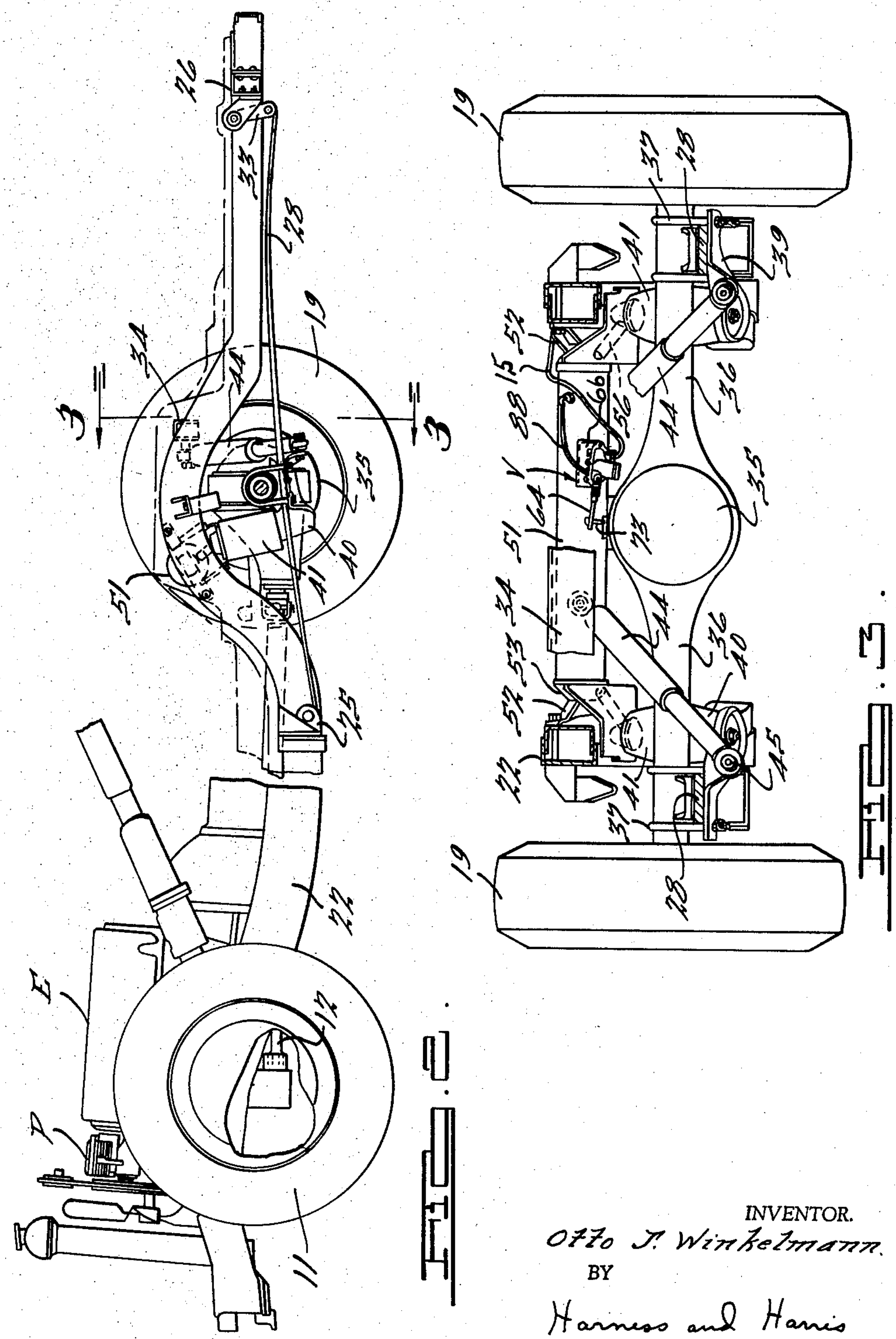
INVENTOR.
Otto J. Winkelmann
BY
Harness and Harris
ATTORNEYS.

COMBINATION AIR SPRING-LEAF SPRING SUSPENSION
Filed Sept. 9, 1957 4 Sheets-Sheet 3
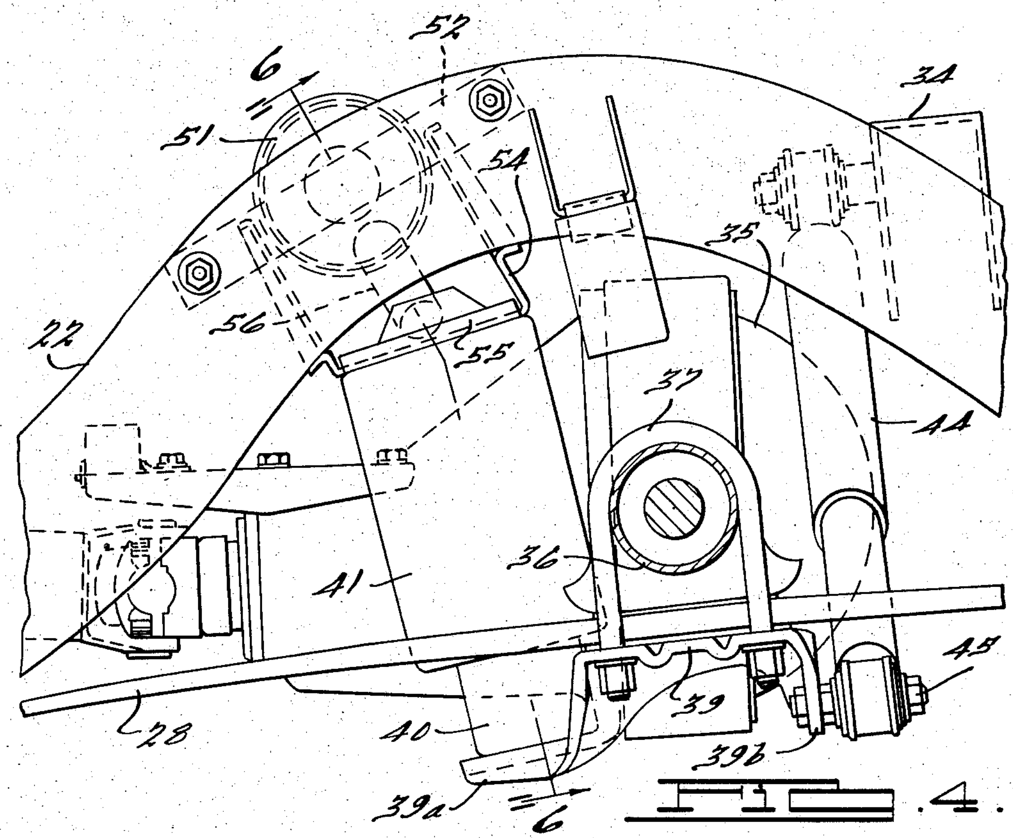
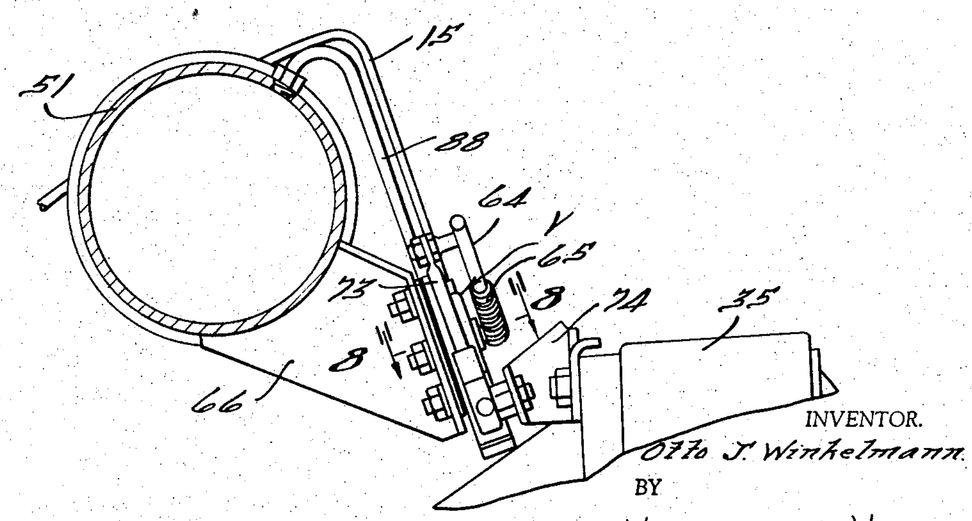
INVENTOR.
Otto J. Winkelmann
BY
Harness and Harris
ATTORNEYS July 19, 1960 O. J. WINKELMANN 2,945,702
COMBINATION AIR SPRING-LEAF SPRING SUSPENSION
Filed Sept. 9, 1957 4 Sheets-Sheet 4
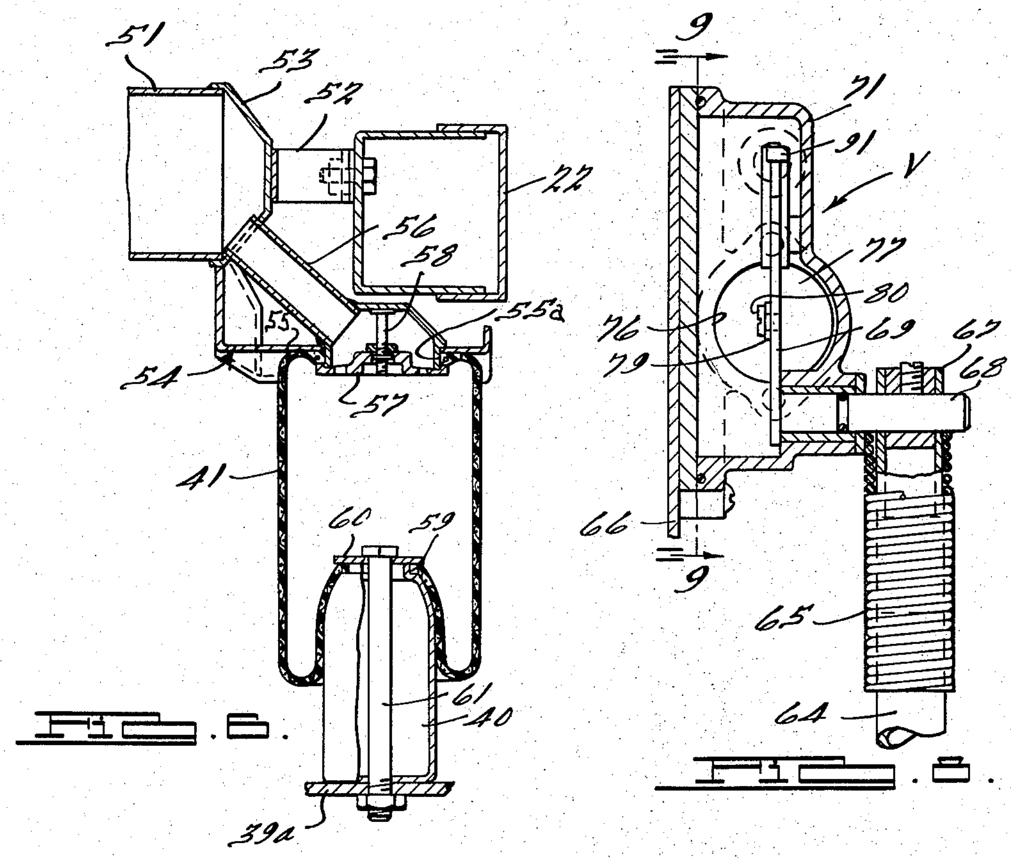
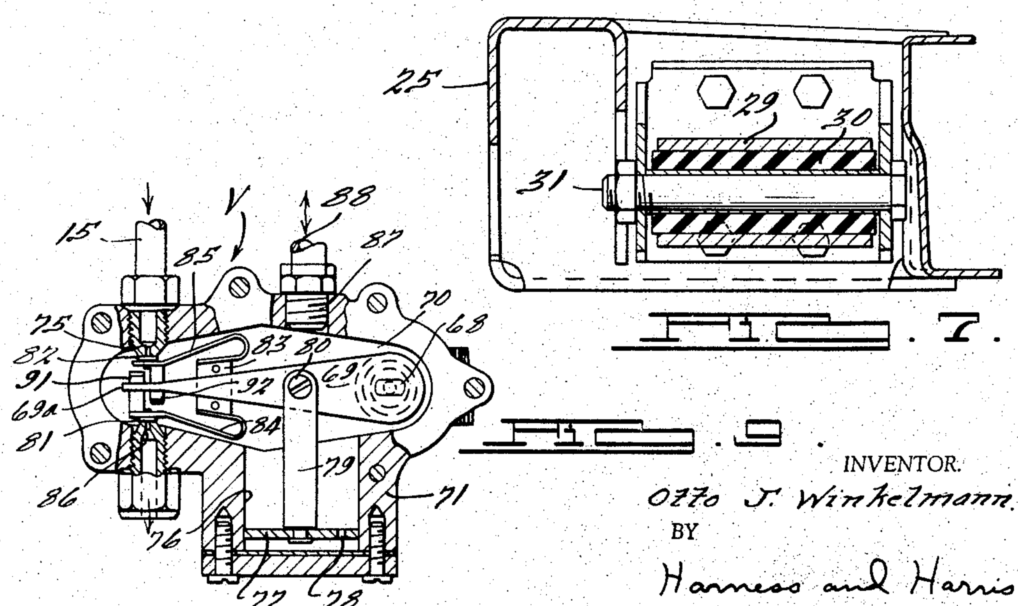
INVENTOR.
Otto J. Winkelmann
BY
Harness and Harris
ATTORNEYS United States Patent Office 2,945,702 Patented July 19, 1960

2,945,702

COMBINATION AIR SPRING-LEAF SPRING SUSPENSION

Otto J. Winkelmann, Birmingham, Mich., assignor to Chrysler Corporation, Highland Park, Mich., a corporation of Delaware Filed Sept. 9, 1957, Ser. No. 682,737

5 Claims. (Cl. 280—124)

This invention relates to a motor vehicle chassis suspension system and particularly to a suspension system using a pair of leaf springs and a pair of air or fluid filled springs arranged in a novel combination whereby the two types of springs each support a portion of the load and the two fluid springs act as a single unit under control of a single leveling valve.

It is a primary object of this invention to provide a low cost combination air and leaf spring chassis suspension system that will have the advantages of a full fluid spring suspension system but wherein a number of the disadvantages and excessive costs of such full fluid spring systems have been eliminated.

It is another object of this invention to provide a combination air and leaf spring rear wheel vehicle suspension system wherein a single load leveling valve unit can be utilized to control the pair of air spring units that are combined with the pair of leaf springs units of the suspension system.

It is still another object of this invention to provide a combination air spring and leaf spring chassis suspension system wherein a single leaf spring can be combined with each air or fluid filled spring in such a manner that a greatly improved chassis suspension is achieved.

It is still another object of this invention to provide a novel combination of a pair of single leaf springs, a pair of fluid filled springs each arranged in parallel with one of the single leaf springs, a fluid reservoir connecting the fluid filled springs, and a single load leveling valve to control fluid supply to the fluid reservoir.

It is still another object of this invention to provide a combination leaf spring and air spring suspension wherein the spaced air springs are interconnected by a common reservoir to provide a low rate air spring in series with the spaced leaf springs, the air springs being controllable by a single load leveling valve.

It is still another object of this invention to so shape the leaf springs that they will compensate for certain disadvantages of the air springs.

Other objects and advantages of this invention will become readily apparent from a reading of the following specification and a consideration of the related drawings wherein:

Fig. 1 is a top plan view of a vehicle chassis embodying this invention, parts being broken away for the sake of space utilization and clarity;

Fig. 1A is a side elevational view of one of the leaf springs associated with the rear wheel suspension, the view being taken along the line 1A—1A of Fig. 1;

Fig. 2 is a side elevational view of the vehicle chassis shown in Fig. 1, parts being broken away and shown in section for the sake of clarity;

Fig. 3 is a sectional elevational view taken along the line 3—3 of Fig. 2;

Fig. 4 is an enlarged fragmentary, sectional elevational view taken along the line 4—4 of Fig. 1;

Fig. 5 is an enlarged, fragmentary, sectional elevational view taken along the line 5—5 of Fig. 1;

Fig. 6 is a fragmentary sectional elevational view taken along the line 6—6 of Fig. 4;

Fig. 7 is an enlarged, fragmentary, sectional elevational view taken along the line 7—7 of Fig. 1;

Fig. 8 is an enlarged, fragmentary, sectional elevational view taken along the line 8—8 of Fig. 5;

Fig. 9 is a fragmentary sectional elevational view taken along the line 9—9 of Fig. 8.

Fig. 1 of the drawings shows a vehicle chassis frame C that has the front wheels 11, 11 independently sprung on torsion bars 12, 12. The front wheel suspension herein disclosed is not a part of this invention so it will not be described in detail. However, it is the suspension that is currently known in the automotive industry as "Torsion-Aire" and it is described in detail in the application of John E. Collier et al., Serial No. 666,293 filed June 18, 1957.

Chassis frame C, at the front end supports an engine E, shown schematically, that is drivingly connected to an air compressor P. The high pressure discharge from compressor P is connected by a conduit 14 to an accumulator A that may be of any conventional type. The accumulator A is connected by suitable conduit means 15 to the leveling valve unit V that is associated with the suspension system for the rear wheels 19, 19. Valve unit V will be described in detail subsequently. It is the rear wheel suspension that involves this invention.

The chassis frame C includes spaced apart side rails 21 and 22 that are interconnected at their opposite ends by the cross-frame members 23 and 24 respectively. Mounted on the outer side of each of the side rails 21 and 22 are a pair of spaced apart, front and rear, leaf spring anchor brackets 25 and 26 respectively. Extending longitudinally of the chassis frame side rails 21, 22 between each pair of brackets 25, 26 is a downwardly bowed leaf spring 28. The front ends of the leaf springs 28 are each formed with an eye portion 29 (see Fig. 7) that mounts a resilient tubular bushing 30. Bushing 30 is anchored to the chassis frame bracket 25 by the anchor bolt 31 that extends thorugh the bore in bushing 30. The rear end of each leaf spring 28 is connected to a pivotally mounted spring shackle 33 that depends from the rear frame bracket 26. Extending transversely of the chassis frame C and connected to an intermediate portion of the leaf springs 28, preferably forwardly of their mid length, is the rear axle housing 35. Axle housing 35 has its tube portions 36 connected to the leaf springs 28 by conventional U-shaped clip shackles or bolts 37. Bolts 37 mount a bracket plate 39 (see Fig. 4) beneath the associated axle housing tube 36 that has a forwardly extending seat portion **39*a* and a rearwardly extending flange 39*b*. The seat portion 39*a* provides the support for the piston or plunger element 40 of the rolling lobe-type air spring 42 that is hereafter further described in detail. The rear flange portion 39*b* of the clip plate 39 provides an anchor for the lower end of the shock absorber 44. Flange portion 39*b* carries a bolt 45 that is pivotally connected to the lower end of the shock absorber 44 in the conventional manner. The upper ends of the shock absorber 44 are pivotally connected to a chassis frame cross member 34**.

It will be noted from a consideration of Figs. 1A and 2 particularly that the leaf springs 28 are of the single leaf type and that they vary in thickness throughout their lengths. These springs are thickest at the points where they are connected to the axle housing arms 36 and they progressively taper downwardly towards their opposite end portions. It will also be noted that in top plan view (Fig. 1) that the leaf springs 28 are narrowest in widths at the points where the springs are attached to the axle housing arms 36 and that they are progressively increased in width from these points towards their opposite ends, This specific shape of the leaf spring is designed so as to give a substantially uniform stress concentration throughout the length of the spring. Also, the increased width at the ends of the leaf springs 28 gives increased roll stiffness which is quite advantageous in a suspension wherein part of the spring support is by way of air springs which have no appreciable roll stiffness whatever.

It has been determined that for passenger motor vehicles of the current conventional type that a rear wheel spring deflection rate of approximately 125–135 lbs./in. is desirable. When a leaf spring, such as the spring 28, is used in the rear wheel suspension then the deflection rate of the leaf spirng alone is approximately 115–120 lbs./in. Such a spring rate for the leaf springs 28 will permit the leaf springs 28 to carry all of the normal curb load carried by the vehicle even if an emergency should nullify the support effect of the air springs 41 which are in parallel with the leaf springs 28. If the desired total spring rate is to be 125–135 lbs./in. and the leaf springs 28 provide 115–120 lbs./in., then the air springs 41 must provide not more than 10–15 lbs./in. This cannot be easily achieved unless the air springs are of relatively large volume. If the springs 41, 41 are of large volume their rate of deflection is low but a large air spring can be a problem because it is desirable to keep the vehicle as low to the ground as possible and not utilize valuable passenger space for housing the large air springs. This problem of using a large volume air spring in parallel with each of the leaf springs 28 has been solved in a novel manner by interconnecting the relatively small-size, rolling lobe air springs 41, 41 by a large volume reservoir or supplementary air spring 51. The reservoir 51 is essentially a large volume tube-like container that is fixedly mounted on a rear portion of the chassis frame C so as to extend transversely of the frame at the location of the air springs 41, 41.

From Figs. 1 and 6 in particular, it will be noted that the tube-like air reservoir or container 51 is connected by brackets 52 to the side rails 21, 22 of the chassis frame C. The opposite ends of the container 51 have caps 53 that are a part of bracket 54 that provides an upper end seat 55 for the associated air spring 41. Brackets 54 each carry a connector tube 56 that will transfer air between the container 51 and the associated air spring 41. From Fig. 6 it will be seen that the bracket 54 has an annular flanged neck 55*a* that seats the upper end of the tube-like resilient air spring 41. The upper end, as well as the lower end, of the air spring 41 has a bead wire embedded therein to provide enlarged end portions on the air springs 41 that facilitate anchoring the ends of the air springs on their seats. After the upper end of the air spring 41 is slipped on the depending neck portion 55*a* of the bracket 54 then the perforated locking disc 57 is threaded on the stud 58 that is fixed to the bracket 54. Locking disc 57 anchors the upper end of the air spring 41 to the chassis frame mounted bracket 54.

The rigid plunger 40 that is fixed to the lower bracket plate portion 39*a* has a groove 59 around its upper end to receive and seat the wire reinforced lower end of the air spring 41. An anchor washer 60 is pulled down on the upper end of plunger 40 by a bolt 61 so that the lower end of air spring 41 is firmly anchored on the upper end of the lower seat plunger 40.

Fixedly mounted on the reservoir 51 (see Figs. 1, 3, 5 and 8) is a leveling valve V that controls the amount of air admitted to or bled from the air springs 41, 41 and their associated reservoir 51. From Figs. 1, 3, 5 and 8 it will be noted that the valve V, that is carried by the bracket 66 on reservoir 51, has an actuator arm 64 connected at one of its ends to a pivot link 73 that is anshored on the rear axle housing 35 by a bracket 74. Valve actuator arm 64 has a flexible section 65 which in the instance shown comprises a coil spring. Spring 65 connects the free end of the actuator arm 64 (see Fig. 8) with the stub crank 67 that is rigidly fastened to the rockshaft 68 of valve unit V. Rockshaft 68 carries the valve control lever 69 (see Fig. 9) that is adapted to oscillate in the chamber 70 within the valve unit housing 71. From the foregoing description it is thought to be obvious that relative vertical movement between the chassis frame C and the rear axle housing 35 will effect oscillatory movement of the rockshaft 68 and its lever arm 69.

Fig. 9 shows one form of air spring control valve V that can be used with this type of air spring suspension. This valve unit V includes a pressurized air inlet port 75 that is connected to the pressurized air supply conduit 15. Pressurized air from the accumulator A is directed through conduit 15 to fill the interior of housing 71. It will be noted that a portion of housing 71 is shaped to form a dashpot cylinder 76. Reciprocably mounted in the dashpot cylinder 76 is a plunger disc 77 that has a bleed opening 78 therethrough. Disc 77 is connected through a rigid link 79 to the valve control lever 69. Link 79 has a pivoted connection 80 with the valve control lever 69. It is thought to be obvious that the air on opposite sides of the disc 77 cooperates with the bleed hole 78 in the disc to provide a dashpot unit that will damp vibration of the control lever 69.

Also mounted within the valve housing 71 are a pair of spring-closed valve units 81 and 82. A bracket 83 fixed to the interior of the housing 71 has spring arms 84 and 85 that respectively mount the valves 81 and 82. The spring arms 84 and 85 urge the valves 81 and 82 to a closed position wherein they seal off the ports 86 and 75 respectively. Port 86 is a bleed port that is connected to the atmosphere so that the pressure of the air contained in the housing 71 and in the air springs 41, 41 and reservoir 51 connected thereto, can be reduced by opening of valve 81. Housing interior 70 is connected through port 87 with a feed conduit 88 that discharges into the reservoir 51 (see Fig. 5). Each valve unit 81, 82 has a depending L-shaped arm 91 and 92 respectively. The flattened end 69*a* of the control lever 69 is adapted to engage one or the other of the valve supported arms 91 and 92 after a predetermined amount of oscillatory movement from its normal position shown in Fig. 9 wherein the air pressure in the spring 41 is in equilibrium with the load applied thereto. The specific valve V shown herewith is not a necessary part of this invention for other type of valves either with or without dashpots can be used.

From the foregoing description it is thought to be clear that a combination air and leaf spring vehicle wheel suspension has been provided wherein the air springs 41, 41 supplement the leaf springs 28, 28 with the air springs including a means V for effecting load leveling. The air springs 41, 41 are effective fluid damping means for road shocks and vibrations and thus they improve the ride that is provided by the leaf springs 28, 28. The fact that the air springs 41, 41 are interconnected by a large volume reservoir 51 permits the use of relatively small air springs 41 and also permits the use of a single leveling valve which materially lessens the cost of the suspension system. Another advantage of the air spring-leaf spring combination is that this combination system will "fail safe," that is even if the air supply should be inoperative, or air leakage should develop, still the leaf springs are able to support the normal curb load and keep the vehicle operative from a suspension standpoint. Another advantage of the combination air spring-leaf arrangement, particularly the specifically disclosed leaf spring type, is that the leaf springs provide sufficient roll stiffness so that separate sway bars or control links, that are conventionally used in air or fluid suspensions, are not required. The fact that a single leveling valve V is all that is required with this fluid suspension, because of the novel arrangement of the air reservoir 51 and the air springs 41, 41, provides an economic advantage for this type of suspension system. The use of a dashpot 76 with the control lever 69 not only damps vibration of this lever 69 but it also provides a time delay to stabilize the leveling operation.

I claim:

1. A vehicle wheel suspension comprising a body supporting frame, axle means extending transversely of the frame mounting transversely spaced road wheels, a pair of transversely spaced leaf springs extending longitudinally of the frame having their opposite end portions connected to the frame with the axle means connected to the springs intermediate the ends thereof, a pair of transversely spaced, air filled, resilient, springs arranged in parallel with said leaf springs between said axle means and said frame, an air reservoir interconnecting said air springs, an air supply system connected to said reservoir, and a frame load leveling valve arranged in the air supply system, said valve interconnecting the frame and axle means so that relative vertical movement therebetween controls the air admitted to and bled from said air springs, said leaf springs each comprising a single leaf element that is of relatively narrow width at its point of connection to the axle means and of a relatively wide width at its end connections to the frame.

2. A wheel suspension as set forth in claim 1 wherein at least one end of each leaf spring has a fixed pivot connection to said frame so that a portion of the leaf spring can function as a drive transmitting strut.

3. In a vehicle wheel suspension comprising a body supporting frame, axle means extending transversely of the frame mounting transversely spaced road wheels, a pair of transversely spaced leaf springs extending longitudinally of the frame having their opposite end portions connected to the frame with the axle means connected to the springs intermediate the ends thereof, said leaf springs being arranged to independently support the major portion of vehicle load applied thereto, a pair of transversely spaced, flexible wall, air filled, springs arranged in parallel with said leaf springs between said axle means and said frame and arranged to support a minor portion of the vehicle load applied thereto and to function as load leveling means, an air reservoir interconnecting and unitary with said air springs, an air supply system connected to said reservoir, and a single load leveling valve arranged in the air supply system and unitary with said reservoir, said valve interconnecting the frame and axle means so that relative vertical movement therebetween controls the air admitted to and bled from said air springs, and said air springs each comprising an elongated rubber-like sleeve having one end portion thereof sealingly connected to the interior of said reservoir and the other end portion sealingly connected to the axle means by a portion bent reversely upon itself for telescopic movement within the sleeve.

4. In a road vehicle, a body frame having a pair of spaced side rails, a single leaf, leaf spring connected to and depending from each side rail, an axle carrier extending transversely of said side rails with the opposite ends thereof connected to transversely aligned intermediate portions of the leaf springs by clamping plates, a flexible wall air spring seated on each clamping plate, a rigid walled air reservoir carried by and extending between said side rails, means carried by said reservoir providing a seat for each of the air springs, conduit means connecting the reservoir to each air spring, an air supply system connected to said reservoir, and a single leveling valve arranged in said air supply system and interconnected between said frame and axle carrier so as to be operable by relative vertical movement therebetween to control the air admitted to and bled from the reservoir, said leaf springs each being relatively narrow in width at their connections to the axle carrier and relatively wide at their opposite end connections to the frame.

5. In a road vehicle, a body frame having a pair of spaced side rails, a leaf spring connected to and depending from each side rail, an axle carrier extending transversely of said side rails with the opposite ends thereof connected to intermediate portions of the leaf springs by clamping plates, a flexible wall air spring having its lower end seated on each clamping plate, an air reservoir carried by and extending between said side rails, unitary means carried by said reservoir providing a seat for the upper end of each of the air springs so that the leaf springs and air springs resiliently support the frame in parallel, conduit means unitary with and connecting the reservoir to each air spring, an air supply system connected to said reservoir, a frame load leveling valve mounted on said reservoir and arranged to control air flow in said air supply system and interconnected by linkage means between said frame and axle carrier so as to be operable by a predetermined relative vetrical movement therebetween to control the air admitted to and bled from the reservoir, and a shock absorber connected between each clamping plate and the frame.

References Cited in the file of this patent

UNITED STATES PATENTS

| | | |
|---|---|---|
| 971,583 | Bell | Oct. 4, 1910 |
| 1,016,326 | Garlick | Feb. 6, 1912 |
| 1,258,355 | Mullen | Mar. 5, 1918 |
| 1,641,640 | Myers | Sept. 6, 1927 |
| 2,361,575 | Thompson | Oct. 31, 1944 |
| 2,691,420 | Fox | Oct. 12, 1954 |